US006536838B1

United States Patent
Nabuurs et al.

(10) Patent No.: US 6,536,838 B1
(45) Date of Patent: Mar. 25, 2003

(54) OPEN ROOF CONSTRUCTION FOR A VEHICLE

(75) Inventors: Martinus Wilhelmus Maria Nabuurs, Overloon (NL); Gerardus Petrus Maria Nellissen, Westerbeek (NL)

(73) Assignee: Inalfa Industries B.V. (NL)

( * ) Notice: Subject to any disclaimer, the term of this patent is extended or adjusted under 35 U.S.C. 154(b) by 21 days.

(21) Appl. No.: 09/913,267
(22) PCT Filed: Nov. 28, 2000
(86) PCT No.: PCT/NL00/00867
§ 371 (c)(1), (2), (4) Date: Dec. 28, 2001
(87) PCT Pub. No.: WO01/47733
PCT Pub. Date: Jul. 5, 2001

(30) Foreign Application Priority Data

Dec. 13, 1999 (NL) ............................................. 1013832

(51) Int. Cl.⁷ ................................................. B60J 7/043
(52) U.S. Cl. ..................................... 296/217; 296/180.5
(58) Field of Search .......................... 296/180.1, 180.5, 296/217, 216.01, 220.01, 216.05

(56) References Cited

U.S. PATENT DOCUMENTS

| | | | | |
|---|---|---|---|---|
| 4,619,480 A | * | 10/1986 | Motoyama et al. .......... | 296/217 |
| 4,659,140 A | * | 4/1987 | Fuerst et al. ................ | 296/217 |
| 4,986,598 A | * | 1/1991 | Yamauchi et al. ........... | 296/217 |
| 5,031,959 A | * | 7/1991 | Queveau ...................... | 296/217 |
| 5,052,745 A | * | 10/1991 | Preiss .......................... | 296/217 |
| 5,052,746 A | * | 10/1991 | Reihl et al. .................. | 296/217 |
| 5,306,069 A | * | 4/1994 | Becker et al. ............... | 296/217 |
| 5,833,305 A | | 11/1998 | Watzlawick et al. ........ | 296/217 |
| 5,836,643 A | | 11/1998 | Preiss .......................... | 296/217 |
| 6,315,355 B1 | * | 11/2001 | Lamm et al. ................ | 296/213 |
| 6,450,568 B1 | * | 9/2002 | Jansen ......................... | 296/217 |
| 2002/0067055 A1 | * | 6/2002 | Jansen ......................... | 296/217 |
| 2002/0084677 A1 | * | 7/2002 | Dittrich et al. .............. | 296/217 |

FOREIGN PATENT DOCUMENTS

EP    0 733 506 A1    9/1996

* cited by examiner

Primary Examiner—Joseph D. Pape
Assistant Examiner—Jason Morrow
(74) Attorney, Agent, or Firm—Westman, Champlin & Kelly, P.A.; Steven Koehler

(57) ABSTRACT

An open roof construction for a vehicle having an opening in its roof, the front part of which opening can be closed by a first panel which is pivotable about a substantially horizontal axis at the front edge thereof, while the remaining part of the roof opening can be closed by means of at least one slidable second panel, comprises a wind deflecting arrangement that functions as a wind deflector. Said wind deflection arrangement can be moved rearwards and upwards, using suitable driving means, from a position of rest under the first panel to an operative position substantially above and behind the first panel. The wind deflection apparatus may be pivotable about a horizontal pivot that extends substantially transversely to the vehicle.

4 Claims, 1 Drawing Sheet

OPEN ROOF CONSTRUCTION FOR A VEHICLE

CROSS-REFERENCE TO RELATED APPLICATION

This application claims priority of International application PCT/NL00/00867, filed Nov. 28, 2000 and published in English.

The invention relates to an open roof construction for a vehicle having an opening in its roof, the front part of which can be closed by a first panel which is pivotable about a substantially horizontal axis at the front edge thereof, whilst the remaining part of the roof opening can be closed by means of at least one slidable second panel.

With prior art open roof constructions of this type the question of how to prevent undesirable inflow of wind into the interior of the vehicle via the roof opening when the second panel is moved to an open position forms a major challenge. After all, such inflow of wind may lead to objectionable resonances, which seriously affect the sense of comfort inside the vehicle. In particular when the second panel is a so-called "topslider", which slides to an open position along the roof of the vehicle on the outside thereof and which is moved slightly upwards prior to such a sliding movement, the phenomenon of undesirable inflow of wind prominently manifests itself.

Over the years measures have already been proposed to overcome or at least alleviate the problem of such inflow of wind. According to the prior art as represented by EP-A-0 733 506, an upwardly extending air deflection element is also used at the free rear edge of the first panel, which is capable of upward pivoting movement about a front edge thereof ("pop-up") and which performs a wind deflecting function in its upwardly pivoted position. When inflow of wind can already be prevented by pivoting said first panel through a small angle, this is a satisfactory solution. When the aforesaid topslider is used as the second panel, however, the first panel needs to perform its wind deflecting function more pronouncedly, which implies using large pivoting angles. When the front edge of the first panel is contiguous to a windscreen (or a roof part) of a vehicle that has a distinct curvature in transverse direction of the vehicle, and consequently the first panel has a corresponding distinct curvature at the location of its front edge, the pivoting of the first panel through large angles will lead to sealing problems at the location of said front edge, which problems can only be overcome by using complicated and expensive sealing means.

Another drawback of the prior art open roof constructions wherein the first panel performs a wind deflecting function is the fact that the shape of the first panel must be such that a continuous and aesthetically attractive roof contour is obtained in the closed position thereof. This is at odds with optimizing the shape of said first panel with a view to deflecting the wind, however, and consequently this is hardly possible, if at all.

The object of the invention is to provide an open roof construction of the present type by which the aforesaid drawbacks are overcome in a simple yet efficient manner.

In order to accomplish that objective, the invention provides an open roof construction of the type referred to in the introduction, wherein a wind deflecting arrangement functioning as a wind deflector is used, which can be moved rearwards and upwards, using suitable driving means, from a position of rest under the first panel to an operative position substantially above and behind the first panel.

In accordance with the inventive concept, the aforesaid wind deflection arrangement is now used for deflecting the wind and no longer primarily the first panel. Of course it remains possible for the first panel to perform a certain function in the deflection of the wind as well, but this is not necessary. Since the wind deflection arrangement is positioned under the first panel in its position of rest, in which position it is hidden from view, its shape can be designed to deflect the wind optimally without there being a need to take aesthetic considerations into account.

The angle through which the first panel is pivoted may be of relatively limited magnitude. The advantage of the fact that the first panel is pivotable is that thus sufficient room is provided for the wind deflection arrangement, which is initially positioned under said first panel, and the driving means thereof to move. This makes it possible to reduce the vertical distance to be made available for the movement of the wind deflection arrangement and driving means thereof, so that the open roof construction will project as little as possible into the interior of the vehicle (which is called compact "packaging" in the industry).

There is another advantage to the aforesaid, usually limited, pivotability of the first panel. The upwardly pivoted first panel can already provide wind deflection to a certain extent before the wind deflection arrangement has been moved from its position of rest to its operative position (which movement is not possible until a sufficient distance has been created between the rear edge of the panel and the front edge of the second panel), thus preventing undesirable inflow of wind (in particular if the aforesaid topslider forms the second panel).

The driving means required for achieving the movement of the wind deflection arrangement may be of any type that is suitable, such as the usual guides that are already being used on a large scale in various embodiments of open roof constructions. In most cases the wind deflection arrangement will have its own, independent drive unit, which can be actuated by automatic means (for example on the basis of the vehicle speed. the wind velocity) or by the driver of the vehicle as desired.

It is noted that from DE 3916906 there is already known an open roof construction wherein a wind deflection arrangement can be moved rearwards and upwards from a position under a fixed roof portion to a position above the roof. Said open roof construction does not comprise a pivotable second panel, however, so that the concomitant advantages are not obtained.

An embodiment of the open roof construction according to the invention that is highly effective with a view to deflecting the wind is obtained when the wind deflection arrangement is pivotable about a horizontal pivot that extends substantially transversely to the vehicle. The horizontal pivot can be moved rearwards and upwards in order to effect the rearward and upward movement of the wind deflection arrangement. By pivoting the wind deflection arrangement about said horizontal pivot it becomes possible to change the angle of the wind deflection arrangement relative to the direction of flow of the oncoming air and thus optimize the obtained flow pattern.

In this framework it is also conceivable for the wind deflection arrangement to have a changeable contour. This can for example be achieved by configuring the wind deflection arrangement as a number of sections disposed one behind another, which are movable with respect to each other, which makes it possible to change the curvature of the wind deflection arrangement, for example. Such a sectional configuration, as it were, makes it possible to influence the flow pattern in a desired manner.

The invention will now be explained in more detail with reference to the drawing, which shows an embodiment of the open roof construction according to the invention.

In the drawing:

FIG. 1 schematically shows an embodiment of the open roof construction according to the invention in completely closed position;

Figure 1:
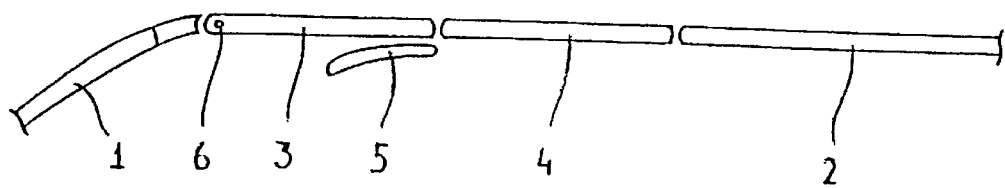

The figures only show those parts of the embodiment of the open roof construction according to the invention to be described hereafter that are essential for a direct understanding of the inventive concept. In principle the figures show a longitudinal section of the relevant part of a vehicle, and the illustrated parts of the open roof construction of the vehicle are only shown in contour. Control means, driving means, guide means, seals and the like are not shown, since they form part of the regular technical knowledge of a person skilled in this field of the art.

In the figures the following parts of a vehicle can be distinguished: a portion of a windscreen 1, a portion of fixed roof part 2, a first panel 3, a second panel 4 and an auxiliary panel 5 which is initially positioned under said first panel and which forms a wind deflection arrangement according to the invention.

First panel 3 pivots about a substantially horizontal pivot 6 near the front edge of first panel 3. Sealing means (not shown) are present at the location where the first panel 3 joins the windscreen 3. The first panel 3 forms a so-called pop-up in the illustrated embodiment.

In the position of rest (closed position) of the open roof construction that is shown in FIG. 1, the second panel 4 joins the rear edge of first panel 3 with its front edge. Also here suitable sealing means may be used. In the position that is shown in FIG. 1, the rear edge of second panel 4 joins the front edge of fixed roof part 2. Auxiliary panel 5 is positioned under first panel 3, where it not visible from outside.

In the position that is shown in FIG. 1, windscreen 1, first panel 3, second panel 4 and fixed roof part 2 form a contiguous contour, whereby aerodynamic and aesthetic considerations can be taken into account.

Figure 2:
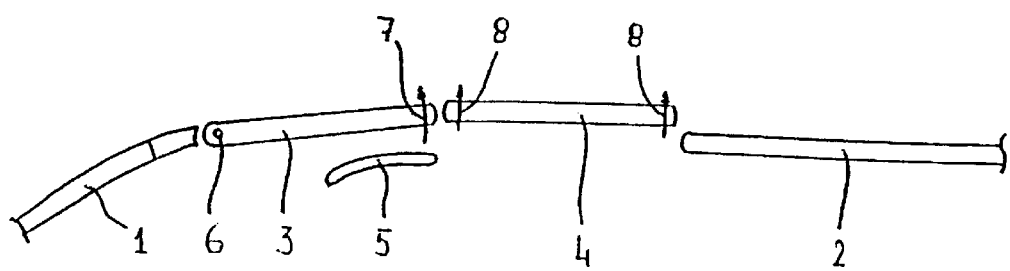
FIG. 2 shows the open roof construction of FIG. 1 in a first intermediate position.

FIG. 2 shows a position wherein first panel 3 has been pivoted through a small angle about pivot 6, as indicated by arrow 7. Furthermore, second panel 4 has been moved upwards with respect to fixed roof part 2, as indicated by arrows 8. This upward movement of second panel 4 makes it possible to subsequently slide said second panel 4 to the rear, outside fixed roof part 2, as a so-called topslider (as shown in FIGS. 3 and 4).

Since the first panel 3 has already been pivoted slightly upwards in the situation that is shown in FIG. 2, inflow of wind on the front side of the second panel 4, which has been slightly lifted as indicated by arrows 8, is prevented.

Figure 3:
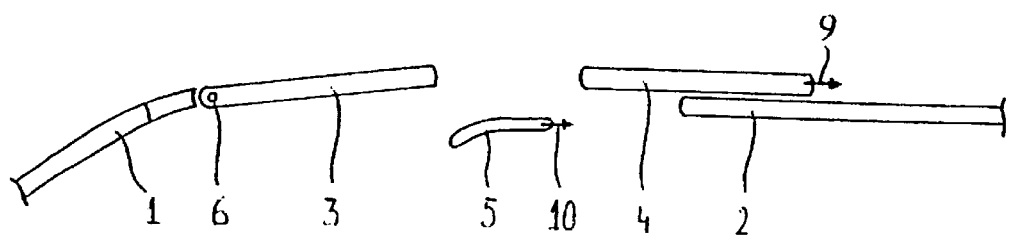
FIG. 3 shows the open roof construction of FIG. 1 in a second intermediate position.

FIG. 3 shows a situation wherein the second panel 4 has already been moved some distance to the rear, outside fixed roof part 2, as indicated by arrow 9. Furthermore, auxiliary panel 5 has been moved to the rear with respect to the first panel 3, as is indicated by arrow 10.

Figure 4:
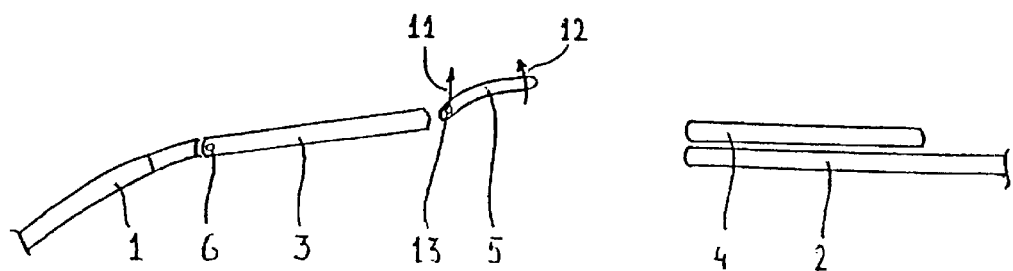
FIG. 4 shows the open roof construction of FIG. 1 in completely open position.

FIG. 4 finally shows an end position of the open roof construction, wherein the second panel 4 has reached its completely open position and auxiliary panel 4 has taken up a position wherein it has been moved upwards with respect to first panel 3, as indicated by arrow 11, and wherein it has been pivoted slightly upwards at its rear side about a pivot 13 that extends substantially transversely to the vehicle, as indicated by arrow 12. in order to prevent undesirable inflow of wind into the roof opening 14, which is now completely open.

It is noted that it is also possible for auxiliary panel 5 to have reached the position that is shown in FIG. 4 already before the second panel 4 has reached the extreme position that is shown in FIG. 4, occupying the position that is shown in FIG. 3, for example.

As already noted before, a continuous roof contour is obtained in the closed position of the open roof construction, since no projecting parts are present. The use of the auxiliary panel provides various possibilities for controlling the air flow over the roof, however, as a result of which an optimum flow pattern can be created. The use of auxiliary panel 5 furthermore makes it possible to reduce the angle through which first panel 3 pivots, thus enabling an optimum seal at the front edge thereof, at the location of windscreen 1, in spite of the strong curvature that is generally present at that location Finally, the possibility of pivoting the first panel 3 provides a great deal of room for the auxiliary panel (which can also be indicated by the term wind deflector) to move, so that little constructional height within the vehicle is taken up (compact "packaging").

The invention is not restricted to the above-described embodiment, which can be varied in several ways without departing from the scope of the invention as defined in the claims.

What is claimed is:

1. An open roof construction for a vehicle having an opening in its roof, the roof opening construction comprising:

a first panel which is pivotable about a substantially horizontal axis at a front edge thereof to open and close a front part of the roof opening;

at least one slidable second panel to open and close a remaining part of the roof opening; and a wind deflector, which can be moved rearwards and upwards from a position of rest under the first panel to an operative position substantially above and behind the first panel.

2. The open roof construction according to claim 1, wherein said wind deflector is pivotable about a horizontal pivot that extends substantially transversely to the vehicle.

3. The open roof construction according to claim 1, wherein said wind deflector has a changeable contour.

4. A method for deflecting air from a roof opening of a vehicle when the vehicle is moving, the roof opening being opened and closed with a pivotable front panel and a slidable rear panel, the method comprising moving a wind deflector from a position below the front panel to a position between the front panel and the rear panel and proximate a rear edge of the front panel.

* * * * *

UNITED STATES PATENT AND TRADEMARK OFFICE
CERTIFICATE OF CORRECTION

PATENT NO. : 6,536,838 B1
DATED : March 25, 2003
INVENTOR(S) : Nabuurs et al.

It is certified that error appears in the above-identified patent and that said Letters Patent is hereby corrected as shown below:

<u>Column 1,</u>
Line 7, change "This application claims priority of International application PCT/NL00/00867, filed November 28, 2000 and published in English." to
-- This application is a national stage filing of and claims priority of International application PCT/NL00/00867, filed November 28, 2000 and published in English. --.

Signed and Sealed this

Sixteenth Day of September, 2003

JAMES E. ROGAN
*Director of the United States Patent and Trademark Office*